United States Patent [19]

Nielsen

[11] Patent Number: 5,308,277
[45] Date of Patent: May 3, 1994

[54] FEMALE PLAYING DOLL, CAPABLE OF IMITATING PREGNANCY AND CHILD BIRTH

[76] Inventor: Pia Nielsen, Sydbakken 51, DK-8462 Harlev, Denmark

[21] Appl. No.: 2,023

[22] Filed: Jan. 8, 1993

Related U.S. Application Data

[63] Continuation of Ser. No. 833,500, Feb. 10, 1992, abandoned.

[51] Int. Cl.5 .................... A63H 3/36; A63H 13/02; G09B 23/28
[52] U.S. Cl. .................................. 446/320; 446/296; 434/273
[58] Field of Search ............... 446/320, 321, 295, 296, 446/369, 376, 472, 489; 434/273

[56] References Cited

U.S. PATENT DOCUMENTS

| | | | |
|---|---|---|---|
| 2,154,121 | 4/1939 | Bold | 446/320 X |
| 2,288,798 | 7/1942 | Fleming | 446/369 |
| 2,548,237 | 4/1951 | Pearson | 446/340 |
| 2,551,560 | 5/1951 | Graves | 446/376 X |
| 4,183,171 | 1/1980 | Terzian | 446/320 |
| 4,197,670 | 4/1980 | Cox | 446/369 |

FOREIGN PATENT DOCUMENTS

| | | | |
|---|---|---|---|
| 2324753 | 11/1973 | Fed. Rep. of Germany | 446/320 |
| 2648359 | 12/1990 | France | 446/320 |
| 9000921 | 2/1990 | PCT Int'l Appl. | 446/320 |
| 2177611 | 1/1987 | United Kingdom | 446/273 |

*Primary Examiner*—David N. Muir
*Attorney, Agent, or Firm*—Antonelli, Terry, Stout & Kraus

[57] ABSTRACT

In order to enable an imitated child birth from a doll the doll body is shaped with a stomach cavity covered from the inside by a flat stomach piece, which is held in a normal position by a spring. When the doll is desired to be pregnant the stomach piece is pressed inwardly, and a baby doll is laid into the cavity provided thereby, this cavity then being closed from outside by means of a separate, bulging stomach element. When it comes to the 'birth' this element can be removed, whereby the baby doll is pressed out by the biased flat stomach piece, which will then automatically return into its normal position.

3 Claims, 1 Drawing Sheet

FEMALE PLAYING DOLL, CAPABLE OF IMITATING PREGNANCY AND CHILD BIRTH

This is a continuation of application Ser. No. 833,500 filed Feb. 10, 1992 abandoned.

FIELD OF THE INVENTION

This invention relates to a female playing doll adapted to temporarily imitate a pregnant state and, after a more or less symbolic child birth, to resume a non-pregnant state.

BACKGROUND OF THE INVENTION

It has already been proposed that a pregnancy may be imitated by placing a suitably bulging cover element on the stomach region of a doll, and that underneath this element there could even be space for a baby doll, which may thus be taken out upon lifting of the bulging element.

As well known, children are very interested in the circumstances around the birth function, and really it is a bad illustration that the baby appears inside a bulging in front of the mother doll's flat stomach. This region can well be shaped with a forwardly open depression, but the covering thereof by pregnancy and non-pregnancy, respectively, would then require two different elements, viz. a bulging and a flat stomach element, respectively, of which at least one can easily get lost.

SUMMARY OF THE INVENTION

It is the purpose of the invention to provide a doll of the discussed type, which can exhibit the required 'stomach depth' for holding a reasonably large baby doll with the use of a bulging cover element, without any separate, loose cover element being required for imitating the flat stomach of the mother doll before and after the birth. It is an associated educational purpose that on this background it is possible to explain to the interested children that the formation of the baby takes place deeper inside the mother body than in front of the stomach thereof.

According to the invention this is achieved by the mother doll being shaped with a deep stomach depression, in which there is provided a spring biased, displaceable flat stomach element, which in a free condition is projectable into a position flush with the remaining stomach region of the doll, while the stomach opening is coverable by a loose, bulging stomach element with a baby doll located between the rear side of the bulging element and the front side of the flat element, with the latter displaced rearwardly all according to the space required by the baby doll. Hereby the baby doll may be designed with a reasonably large size without the bulging element having to be overdimensioned, and the flat stomach element will automatically assume its correct position whenever the mother doll is wanted to be 'normal'. Symbolically the birth will happen in an active manner in that the flat stomach element will press the baby doll out of the mother body, when the bulging stomach element is removed, this at least being more realistic than if the baby doll is to be picked or poured out.

There have been prior proposals of how to arrange for a pregnant doll and for the birth of a baby thereof, but the known proposals are not well suited for use with relatively small dolls of the so-called mannequin type, where there is a minimum of space available for the special arrangement. The present invention is particularly well suited for such small size dolls, the hip dimensions of which should generally be kept small. Typically the doll will have a height of 20–40 cm, preferably approximately 30 cm, with a torso height of 8–12 cm, preferably some 9–10 cm. By way of example, the loose, bulging stomach element may be removably fastened by means of resilient hook portions engaging with holding recesses at the inside of a cylindrical skirt projecting inwardly from the stomach opening, while this skirt may form a guiding cylinder for the depressable flat stomach element, whereby there will be no need for using visible holding means for the bulging stomach element; even if the baby doll is not placed inside the bulging element such hook portions, by the mounting of this element, may cause an inward displacement of the flat stomach element sufficiently to ensure the desired holding engagement and still without the flat stomach element having to be a loose, detatchable element.

BRIEF DESCRIPTION OF THE DRAWINGS

In the following the invention is described in more detail with reference to the drawing, wherein:

FIG. 1 is a perspective view of a doll torso according to the invention, while

DETAILED DESCRIPTION

Figure 1:
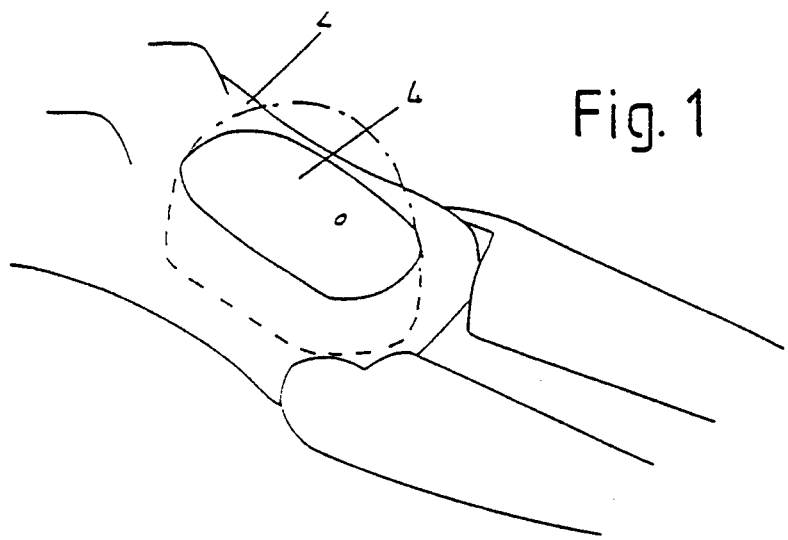
Figure 2:
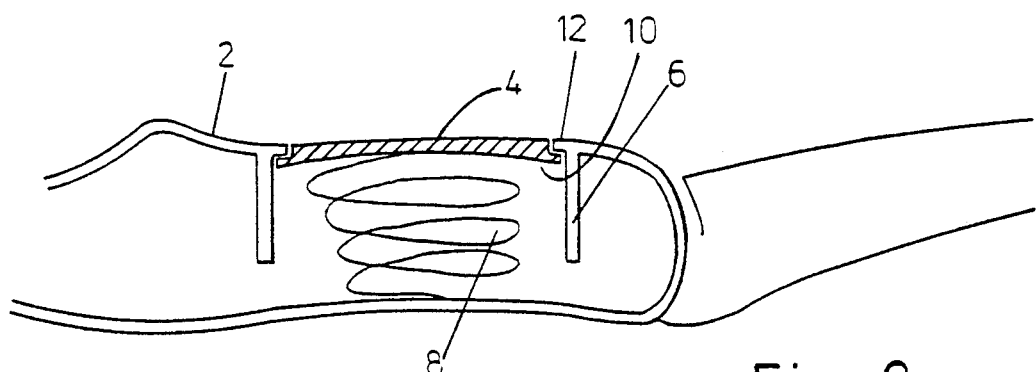
FIGS. 2 and 3 are sectional views thereof.

In FIG. 1 is shown a doll torso 2 having a flat stomach portion 4. As shown in more detail in FIG. 2 this portion consists of a separate plate element which is received in a cylinder skirt 6 projecting inwardly from the torso edge around the stomach portion 4, a compression spring 8 being arranged between the stomach portion 4 and the adjacent back side of the torso. The stomach plate 4 is provided at least locally with a depressed, outwardly projecting edge portion 10 that is held behind an edge projection 12 at the front end of the skirt 6. If the skirt projects directly from the edge of the stomach opening, then the parts 10 may represent local projections located in respective slots in the skirt 6. In both cases the stomach plate 4 will be urged by the spring 8 into a foremost position, in which it is flush with the front side of the torso, such that the doll will exhibit a usual, flat stomach.

Figure 3:
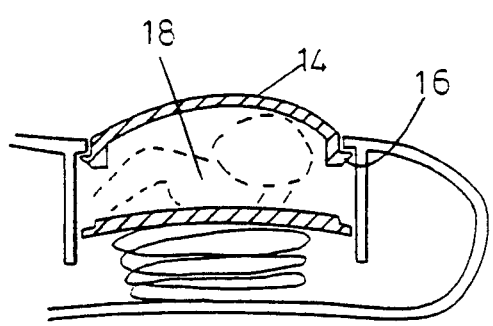

To the doll belongs a separate, bulging stomach element 14, which as shown in FIG. 3 is insertable into the stomach opening so as to be held therein by means of resilient holding nose portions 16 also allowing for a later removal of this stomach cover. As shown in FIG. 3 the doll can be made pregnant by placing the baby doll 18 on the flat stomach portion 4 and covering it with the bulging element 14, whereafter this element is pressed inwardly against the action of the spring 8 until the nose portions 16 engage under the edge portions 12. The doll will now appear pregnant in shape, yet also with a laid-in and releasable baby, which, due to the possible depression of the stomach portion 4, can have a reasonably large size without the bulging stomach element 14 having to be unduly oversized.

The baby doll may be 'born' just by removal of the bulging element 14, whereby the spring 8 and the stomach plate 4 will serve to automatically press out the baby doll 18 in a manner such that the mother doll will thereafter and fully automatically regain its flat stomach shape, as the stomach plate will only be returned into its normal position.

The invention is not limited to the bulging element 14 being held just as shown and described; by way of example it can be made of relatively soft and resilient rubber, simply for being squeezable in the stomach opening.

In order to imitate a gradual development of the pregnancy the doll set may comprise not only one, but two or even more stomach elements 14 of increasing bulge size, and of course a complete set may then comprise different clothings adapted to the different stages of the pregnancy.

Correspondingly the doll set may comprise more than one baby doll, viz. one or more smaller babies illustrating the growth of the embryo. Even twin babies could be provided.

It might be relevant to mark on the doll torso the correct location of the birth opening.

The doll may be modified such that the flat stomach portion 4 is releasably arrestable in its depressed position or in any more or less depressed position, subject to being released by a further short depression or by actuation of some separate actuator means, e.g. located at the backside of the doll. A releasable locking is easy to provide, e.g. with suitable spacer elements inserted between the opposed edge portions 10 and 12 when the stomach plate 4 is depressed.

I claim:

1. A female playing doll adapted to temporarily imitate a pregnant state and, after a symbolic child birth, to resume a non-pregnant state, characterized in that the doll body is provided with an inwardly extending deep stomach cavity, in which is accomodated a flat, forwardly displaceably biased stomach member, said stomach member biased by a spring in said deep stomach cavity and when in a free condition, is urged into a position flush, with a surrounding stomach surface of the doll, said surrounding stomach surface including an inward edge, said cavity further being closable by a separate bulging stomach element with a baby doll interposed between a rear side of the bulging stomach element and a front side of the flat stomach member, and the flat stomach member being rearwardly depressed in dependance upon a space occupied by the baby doll wherein said inward edge engages and retains either of said bulging stomach element or said flat biased stomach member.

2. A doll according to claim 1, wherein said bulging stomach element is provided with outwardly projecting resilient hook portions by which the bulging stomach element can be releasably secured to said inward edge of the surrounding stomach surface, from where an inwardly extending cylinder skirt forms a guiding cylinder for the flat stomach member.

3. A doll according to claim 1, wherein the doll is of a small mannequin-type doll having a torso height of 8-12 cm.

* * * * *